Patented Jan. 6, 1953

2,624,732

UNITED STATES PATENT OFFICE 2,624,732

PREPARATION OF 5-BENZYL-2,4-DIAMINO-PYRIMIDINES

George H. Hitchings, Tuckahoe, and Elvira A. Falco, New Rochelle, N. Y., assignors to Burroughs Wellcome & Co. (U. S. A.) Inc., Tuckahoe, N. Y., a corporation of New York No Drawing. Application May 10, 1950,
Serial No. 161,256

2 Claims. (Cl. 260—256.4)

This invention discloses a new group of 2,4-diamino-5-benzylpyrimidines which have valuable antibacterial and antimalarial activities and certain other properties of value as pharmaceutical substances. They furthermore have certain uses in veterinary medicine.

Valuable properties are conveyed on these substances by certain substituents of the benzene ring, as enumerated below. Substitution, particularly in the para position, by electron-withdrawing groups or atoms such as halogens, or the nitro group imparts anti-malarial properties. On the other hand, electron-donating functions such as alkoxyl, alkyl, amino and dialkyl amino groups results in anti-bacterial potency. In the absence of either type of substitution potency of either form is absent or vestigial in nature.

The preparation of these substances involves the synthesis of a suitable hydrocinnamic ester (I), which is formylated (II) and condensed with guanidine to give a 2-amino-4-hydroxypyrimidine (III). Subsequent conversion to the diamino compound takes place readily by chlorination and amination, or by thiation

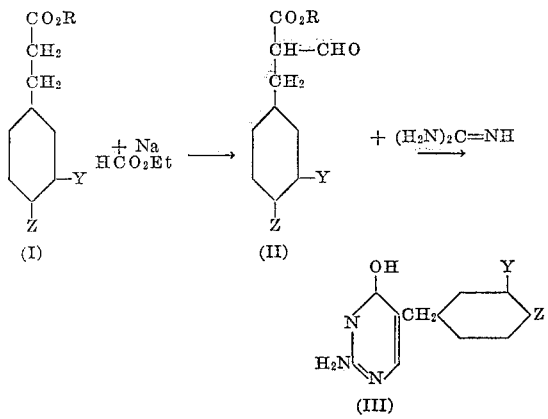

and amination as described in our cognate applications Serial Numbers 33,677 and 33,678 in conjunction with the method of U. S. Patent No. 2,415,793 to Hitchings and Elion.

The following examples will serve to illustrate the teachings of the art but in no way limit the invention, the scope of which is defined in the claims.

EXAMPLE 1

2,4-DIAMINO-5-P-CHLOROBENZYLPYRIMIDINE

A. *2-Amino-4-hydroxy-5-p-chloro benzylpyrimidine*

To 12.6 g. (0.548 mole) of sodium wire in 1500 ml. of sodium-dried ether were added slowly down a reflux condenser a mixture of 116.5 g. of ethyl-p-chlorohydrocinnamate (0.548 mole) and 44.6 g. of ethyl formate (0.6 mole). This reaction mixture was allowed to stand overnight and then to it was added a mixture of 12.6 (0.548 mole) of sodium in 500 ml. of absolute ethanol and 52.3 g. (0.548 mole) of guanidine hydrochloride. The ether was boiled off and the mixture was refluxed for 4 hours on the steam bath. The mixture was then poured into 2 liters of water and neutralized with glacial acetic acid. The precipitate thus formed was filtered off and washed with 50% ethanol. The product recrystallized by solution in dilute alkali and precipitation with dilute acetic acid melts at 278–282°.

B. *2,4-Diamino-5-p-chlorobenzylpyrimidine*

15 g. of 2-amino-4-hydroxy-5-p-chlorobenzyl pyrimidine (0.0637 mole) were refluxed with 150 ml. of phosphorous oxychloride for ½ hour. The excess reagent was taken off in vacuo and the residue decomposed by pouring over 200 grams of ice. This was made alkaline with ammonium hydroxide to pH 9 and filtered. The crude 2-amino-4-chloro-pyrimidine was sucked dry and placed in a bomb with 200 ml. of saturated (10°) ethanolic ammonia. The bomb was heated at 150° for 16 hours, opened and the alcohol evaporated on the steam bath. The residue was taken up in dilute acetic acid and precipitated by the addition of sodium hydroxide to pH 10. The resulting precipitate was filtered and recrystallized from 95% ethanol, to give white needles melting at 205–208°.

EXAMPLE 2

2,4-DIAMINO-5-(3'4'-DIMETHOXYBENZYL) PYRIMIDINE

A. *2-Amino-4-hydroxy-5-(3'4'-dimethoxybenzyl) pyrimidine*

This compound was prepared in the same manner as example 1-A by the addition of 60 g. of ethyl-3'4'-dimethoxy-hydrocinnamate and 20.6 g. of ethyl formate to 5.8 g. of sodium wire in ether to give the crude sodium formyl compound which was condensed with 24.2 g. of guanidine hydrochloride in 5.8 g. of sodium in alcohol. The crude amino-hydroxy compound thus obtained melted at 230–237°.

B. *The preparation of the 2,4-diamino-5-(3'4'-dimethoxybenzyl) pyrimidine*

This compound was prepared in the same manner as example 1-B. The amino-hydroxy compound was converted to the amino-chloro compound by means of phosphorous oxychloride, the crude chloro compound was then heated with alcoholic ammonia at 150° to give 2,4-diamino-5-(3'4'-dimethoxybenzyl)-pyrimidine. This melts at 224-229° after recrystallization by solution in dilute acetic acid and precipitation with alkali at pH 10.

EXAMPLE 3

2,4-DIAMINO-5-P-METHYLBENZYL PYRIMIDINE

This compound was prepared from 75 g. of ethyl-p-methylhydrocinnamate in the same manner as described in Example 1-A. It crystallized from dilute alkali and was precipitated by dilute acid to melt at 248-49°. The aminohydroxy pyrimidine was chlorinated and aminated as previously described to give 2,4-diamino-5-p-methylbenzylpyrimidine melting at 166-171°.

EXAMPLE 4

2,4-DIAMINO-5-P-DIMETHYLAMINO-BENZYLPYRIMIDINE

The aminohydroxypyrimidine was prepared from ethyl-p-dimethylaminohydrocinnamate in the same manner as Example 1-A and gave yellow crystals melting at 263-266°. This was chlorinated and aminated in the usual way. The compound after solution in dilute acetic acid and precipitation at pH 10-11 with dilute sodium hydroxide melted at 231-235°.

EXAMPLE 5

2,4-DIAMINO-5-NITROBENZYLPYRIMIDINE (a) 2-amino-4-hydroxy-5-benzylpyrimidine was prepared from ethyl hydrocinnamate in the manner previously described to give a compound melting at 235-239°. This was chlorinated and aminated in the usual manner to give 2,4-diamino-5-benzylpyrimidine melting at 194-199°.

ANALYSIS

|   | Theory | Found |
|---|--------|-------|
| C | 66.0   | 66.01 |
| H | 6.0    | 5.72  |
| N | 28.0   | 27.8  |

(Literature M. P. Kast=145-6° Berichte 45, p. 3134.)

(b) 1.7 g. of 2,4-diamino-5-benzylpyrimidine was dissolved in 20 ml. of concentrated sulfuric acid and cooled to −5°. To this was added 1.4 g. potassium nitrate keeping the temperature below 10°. The mixture was then poured over 50 g. of ice and the resulting precipitate filtered. This was then placed in hot water and filtered into an excess of dilute alkali. After one more crystallization from dilute acid and precipitate with alkali, 1.5 g. of a yellow crystalline compound resulted, which melted at 238-9°.

EXAMPLE 6

2,4-DIAMINO-5-O-CHLOROBENZYLPYRIMIDINE

The aminohydroxy compound melting at 253-8° was prepared from ethyl o-chloro-hydrocinnamate. This compound was chlorinated and aminated in the usual manner to give 2,4-diamino-5-o-chlorobenzylpyrimidine melting after two recrystallizations from 95% ethanol at 228-9°.

EXAMPLE 7

2,4-DIAMINO-5-P-METHOXYBENZYLPYRIMIDINE

The aminohydroxy compound was prepared in the usual manner from ethyl-p-methoxy-hydrocinnamate. It was converted by means of phosphorous oxychloride and subsequent amination to 2,4-diamino-5-p-methoxybenzylpyrimidine melting at 198-202°, in white micro needles from 95% ethanol.

Since the base is the physiologically active moiety in any non-toxic salt of any compound described herein, the known non-toxic salts of these derivatives are to be regarded as equivalents of the uncombined bases described in the specification and claims herein.

We claim:

1. The method of preparation of a 5-benzyl-2,4-diaminopyrimidine, which consists in the preparation of an alphaformylhydrocinnamic ester, condensation of the latter with guanidine, followed by chlorination and amination.

2. The method of preparing a 5-benzyl-2,4-diaminopyrimidine, which consists in the preparation of an α-formylhydrocinnamic ester, condensation of the latter with guanidine, chlorinating and then heating the product in an alcoholic solution of ammonia to form the 5-benzyl-2,4-diaminopyrimidine.

GEORGE H. HITCHINGS.
ELVIRA A. FALCO.

REFERENCES CITED

The following references are of record in the file of this patent:

Kast: Ber. Deut. Chem. 45, 3135 (1912).